United States Patent [19]

Takahashi et al.

[11] 4,283,522

[45] Aug. 11, 1981

[54] PROCESS FOR PREPARING THERMOSETTING PREPOLYMER FROM MIXTURE OF POLYFUNCTIONAL MALEIMIDE AND BIS-MALEIMIDE

[75] Inventors: Akio Takahashi, Hitachi-Oota; Yutaka Itoh, Hitachi; Motoyo Wajima, Hitachi; Hirosada Morishita, Hitachi; Kenji Tsukanishi, Shimodate, all of Japan

[73] Assignee: Hitachi Chemical Company, Ltd., Tokyo, Japan

[21] Appl. No.: 71,518

[22] Filed: Aug. 31, 1979

[30] Foreign Application Priority Data

Aug. 31, 1978 [JP] Japan ................. 53-106671

[51] Int. Cl.$^3$ ............... C08G 69/26; C08G 73/10
[52] U.S. Cl. ............... 528/170; 528/125; 528/168; 528/317; 528/321; 528/322
[58] Field of Search ............ 528/322, 321, 170, 125, 528/168, 228, 317

[56] References Cited

U.S. PATENT DOCUMENTS

| | | | |
|---|---|---|---|
| 3,562,223 | 2/1971 | Bargain et al. | 528/322 |
| 3,658,764 | 4/1972 | Bargain et al. | 528/322 |
| 3,883,486 | 5/1975 | Bargain | 528/322 |

*Primary Examiner*—Harold D. Anderson
*Attorney, Agent, or Firm*—Sprung, Felfe, Horn, Lynch & Kramer

[57] ABSTRACT

A process for preparing a thermosetting maleimide type prepolymer which comprises heating (A) a polyfunctional maleimide compound derived from a polyamine prepared from aniline and formalin, (B) a bis-maleimide and (C) a diamine. The thermosetting maleimide type prepolymer prepared according to the process of the present invention is excellent in solubility in low boiling point solvents such as acetone, methyl ethyl ketone and methyl cellosolve, which are available at low cost. Accordingly, the prepolymer is advantageously used especially for the production of laminated boards having excellent heat resisting properties.

10 Claims, No Drawings

PROCESS FOR PREPARING THERMOSETTING PREPOLYMER FROM MIXTURE OF POLYFUNCTIONAL MALEIMIDE AND BIS-MALEIMIDE

The present invention relates to the preparation of a maleimide type prepolymer. More particularly, the invention relates to a process for preparing a thermosetting maleimide type prepolymer which is very excellent in solubility in low boiling point solvents such as acetone, methyl ethyl ketone and methyl cellosolve.

Dehydrocondensation polyimides and amine-cured maleimide type polyimides are well known as thermoset resins having excellent heat resisting properties and classified as class H or C insulation according to Japanese Industrial Standard C 4003 (resistant to temperatures of 180° C. or more). The latter amine-cured maleimide type polyimides have been increasingly used because they do not involve problems such as condensation water formation, poor curability and poor moldability.

In the preparation of amine-cured maleimide type polyimides, amino-bis-maleimides having a bis-maleimide skeletal structure are mainly used. The amino-bis-maleimides are prepolymers prepared by addition-reacting a diamine with a bis-maleimide at the double bonds thereof and can be complicatedly cross-linked by heating to effect addition reaction of the amine moiety with the double bond and radical polymerization by means of the double bonds, whereby solvent-insoluble and infusible polymers having very excellent heat resisting properties can be formed.

However, conventional amino-bis-maleimides prepolymers cannot dissolve in ordinary solvents other than special solvents such as N-methyl-2-pyrrolidone and N,N'-dimethylformamide which are highly dipolar, of high boiling point and of high cost, thus providing various problems when they are used in the form of a solution thereof. For example, where such conventional prepolymers are used in the form of a solution thereof for the production of laminated boards, the following problems are encountered from the viewpoints of workability and properties of the laminated boards. At the time of application of the solution to a base material such as glass cloth or paper, the solvent is splashed on workers and it is hard for the splashed solvent to escape from the workers. An uneven surface of the prepreg is liable to be formed in the course of prolonged drying. Further, unfavorable condensation of the solvent is liable to occur on the inner wall of the dryer for the prepreg. A slight amount of the solvent tends to remain in the laminated board, adversely affecting the characteristics of the laminated boards such as moisture resistance (e.g., in respect of insulating properties) and heat resistance (e.g., in respect of occurrence of cracking and/or blistering by heating, for example, at the time of soldering operation). For completely drying the prepreg, a high temperature and a long time are required, leading to increases in cost and time for the production of the laminated boards.

The present invention is to solve the above-mentioned problems accompanying the practical use of the conventional amino-bis-maleimide prepolymers for obtaining the amine-cured maleimide type polyimide and to provide a process for preparing a thermosetting maleimide type prepolymer which can be dissolved in a low boiling point solvent of low cost such as acetone, methyl ethyl ketone or metyl cellosolve to give a solution having a solid concentration of 50% by weight or more and, hence, provides good workablility and which forms, upon heat-curing, a polyimide having heat resisting properties comparable to those of the polyimides formed from the conventional amino-bis-maleimide prepolymers.

More specifically, in accordance with the present invention, there is provided a process for preparing a thermosetting maleimide type prepolymer, which comprises heating (A) a polyfunctional maleimide compound represented by the formula (1):

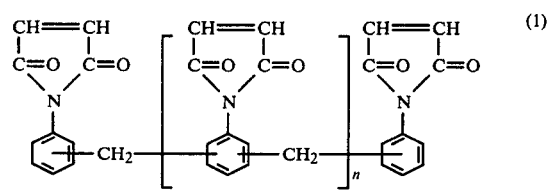

wherein n is in the range of from 0.1 to 3.0;

(B) a bis-maleimide represented by the formula (2):

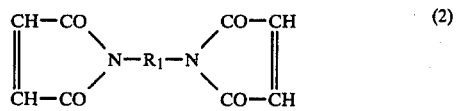

wherein $R_1$ represents a divalent radical having at least 2 carbon atoms; and (C) a diamine represented by the formula (3):

wherein $R_2$ represents a divalent radical having at least 2 carbon atoms;

the weight proportion of the polyfunctional maleimide compound (A) relative to the total of the polyfunctional maleimide compound (A) and the bis-maleimide (B) being 10 to 80% and the molar ratio of the total of the polyfunctional maleimide compound (A) and the bis-maleimide (B) to the diamine (C) being 1:1 to 1:0.3.

The prepolymers obtained according to the process of the present invention can be dissolved in a low boiling point solvent of low cost such as acetone, methyl ethyl ketone or methyl cellosolve to give a solution having a solid concentration of 50% by weight or more and form, by heat-curing, polyimides having heat resisting properties comparable to those of the polyimides formed from the conventional amino-bis-maleimide prepolymers. On the other hand, amino-bis-maleimide prepolymers which are obtained by heating the bis-maleimide (B) and the diamine (C) in the molten state for effecting the reaction therebetween and which are represented by the well known Kerimid 601 (trade name of an amino-bis-maleimide type prepolymer manufactured by Rhone-Poulenc S.A., France) are soluble only in special dipolar solvents such as N-methyl-2-pyrrolidone and N,N'-dimethylformamide.

The characteristic and essential feature of the present invention resides in the use of a polyfunctional maleimide compound (A) for the preparation of a prepolymer.

The polyfunctional maleimide compound (A) to be used in the process of the present invention is obtained by the well known dehydration reaction of an amide acid formed from maleic anhydride and a polyamine prepared by the condensation of aniline with formaldehyde, and is required to have an average molecular weight corresponding to n in the range of from 0.1 to 3.0, preferably in the range of 0.2 to 2.5, in the formula (1) from the viewpoint of heat resisting properties of the cross-linked polyimide formed from the prepolymer prepared according to the present invention.

As the bis-maleimide (B) to be used in the process of the present invention, there can be mentioned, for example, N,N'-4,4'-diphenylmethane-bis-maleimide, N,N'-methylenebis (3-chloro-p-phenylene)-bis-maleimide, N,N'-4,4'-diphenylsulfone-bis-maleimide, N,N'-4,4'-diphenyl-ether-bis-maleimide, N,N'-ethylene-bis-maleimide and N,N'-hexamethylene-bis-maleimide. They may be used either alone or in combination.

As the diamine (C) to be used in the process of the present invention, there can be mentioned, for example, 4,4'-diaminodicyclohexylmethane, 1,4-diaminocyclohexane, 2,6-diaminopyridine, m-phenylenediamine, p-phenylenediamine, 4,4'-diaminodiphenylmethane, 2,2'-bis(4-aminophenyl)propane, benzidine, 4,4'-diaminodiphenylsulfone, bis(4-aminophenyl) methylphosphine oxide, bis(4-aminophenyl) phenylphosphine oxide, bis(4-aminophenyl)methylamine, 1,5-diaminonaphthalene, m-xylylenediamine, p-xylylenediamine, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d)thiazole, 5,5'-di(m-aminophenyl)-2,2'-bis(1,3,4-oxadiazolyl), 4,4'-diaminodiphenyl ether, 4,4'-bis(p-aminophenyl)-2,2'-dithiazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine and 4,4'-methylenebis(2-chloroaniline). They may be used either alone or in combination.

A preferred sub-group of amines comprises m-phenylene-diamine, p-phenylenediamine, 4,4'-diaminodiphenylmethane, 2,2'-bis(4-aminophenyl)propane, 4,4'-diaminodiphenylsulfone, bis(4-aminophenyl)methylphosphine oxide, bis(4-aminophenyl)phenyl-phosphine oxide, bis(4-aminophenyl)phenyl-phosphine oxide, bis(4-aminophenyl)methylamine, p-xylylenediamine, hexamethylenediamine, bis(4-aminophenyl)phenylmethane, 4,4'-diaminodiphenyl ether and 4,4-methylenebis(2-chloroaniline).

The weight proportion of the polyfunctional maleimide compound (A) relative to the total of the polyfunctional maleimide compound (A) and the bis-maleimide (B) is required to be 10% or more in the process of the present invention so as to provide a polyfunctional maleimide-bis-maleimide prepolymer capable of being dissolved in a low boiling point solvent such as acetone, methyl ethyl ketone or methyl cellosolve to give a solution having a solid concentration of 50% by weight or more. In order not to spoil excellent heat resisting properties which the bis-maleimide skeletal structure imparts to a thermoset polyimide, the weight proportion of the polyfunctional maleimide compound (A) relative to the total of the polyfunctional maleimide compound (A) and the bis-maleimide (B) is required to be 80% or less, preferably 70% or less, in the process of the present invention. The molar ratio of the total of the polyfunctional maleimide compound (A) and the bis-maleimide (B) to the diamine (C) is in the range of from 1:1 to 1:0.3 in the process of the present invention. Where the above-mentioned molar ratio is less than 1:1, the reaction proceeds too fast and, hence, it is difficult to control the reaction. Where the above-mentioned molar ratio is more than 1:0.3, the reaction proceeds too slowly and, in addition, the solubility of the resulting prepolymer in low boiling point solvents tends to be unsatisfactory.

The process of the present invention may be practiced either in the molten state of the materials or in the dissolved state of the materials in a solvent such as 2-methoxyethanol (i.e. methyl cellosolve), 2-ethoxyethanol (i.e. ethyl cellosolve), 2-(methoxymethoxy)ethanol or 2-isopropoxyethanol. In practicing the process either in the molten state of the materials or in the dissolved state of the materials in a solvent, the reaction temperature may be chosen within the range of from 80° to 180° C., but the reaction temperature of 100° to 150° C. is most preferred from the viewpoint of ease in controlling the reaction, and the reaction period of time may be in the range of from 5 to 120 minutes, preferably in the range of from 10 to 60 minutes.

The following Examples illustrate the present invention in more detail but should not be construed as limiting the scope of the invention.

In the following Examples, all "parts" are by weight.

EXAMPLES 1 TO 9 AND COMPARATIVE EXAMPLES 1 AND 2

EXAMPLE 1

(A)

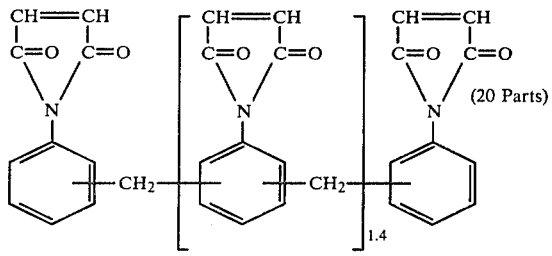

(B) N,N'-4,4'-Diphenylmethane-bis-maleimide (80 Parts)

(C) 4,4'-Diaminodiphenylmethane (20 Parts)

The above-mentioned three components were reacted in the molten state at 120° to 130° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 2

(A)

-continued

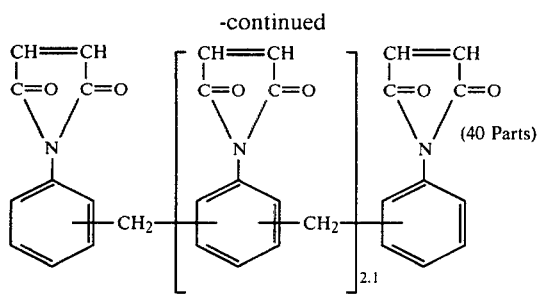
(40 Parts)

(B)  N,N'-4,4'-Diphenylmethane-bis-maleimide  (60 Parts)

(C) 4,4'-Methylenebis(2-chloroaniline) (35 Parts)

The above-mentioned three components were reacted in the molten state at 120° to 130° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 3

(A)
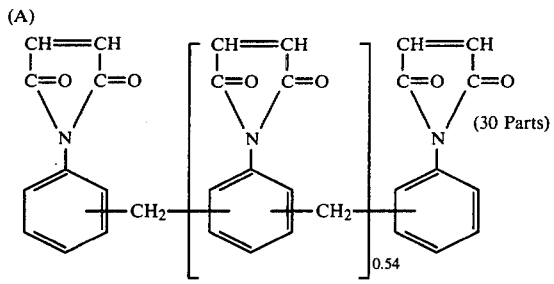
(30 Parts)

(B) N,N'-Methylenebis (3-chloro-p-phenylene)-bis-maleimide (70 Parts)

(C) 4,4'-Diaminodiphenylmethane (25 Parts)

The above-mentioned three components were reacted in the molten state at 120° to 130° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 4

(A)
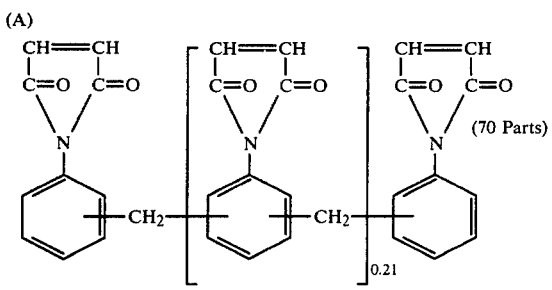
(70 Parts)

(B)  N,N'-4,4'-Diphenyl-ether-bis-maleimide  (30 Parts)

(C) 4,4'-Diaminodiphenylmethane (25 Parts)

The above-mentioned three components were reacted in the molten state at 120° to 130° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 5

(A)
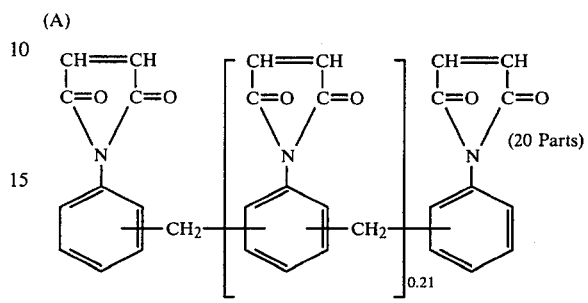
(20 Parts)

(B)  N,N'-4,4'-Diphenylmethane-bis-maleimide  (80 Parts)

(C) 4,4'-Diaminodiphenylmethane (43 Parts)

The above-mentioned three components were reacted in the molten state at 140° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 6

(A)
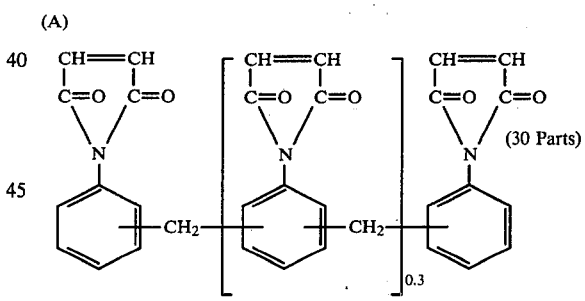
(30 Parts)

(B)  N,N'-4,4'-Diphenyl-ether-bis-maleimide  (70 Parts)

(C) Hexamethylenediamine (15 Parts)

The above-mentioned three components were reacted in the molten state at 120° to 140° C. for 15 minutes to obtain a reddish and transparent prepolymer. The prepolymer thus obtained could be dissolved in each of acetone, methyl ethyl ketone and methyl cellosolve to give a solution having a solid concentration exceeding 50% by weight.

EXAMPLE 7

(A)

-continued

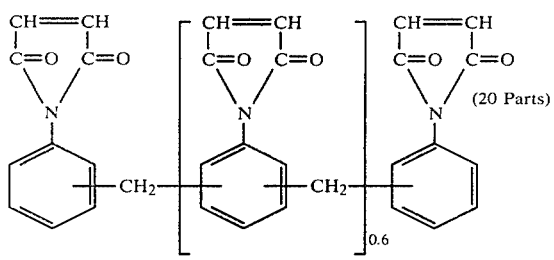
(20 Parts)

(B) N,N'-4,4'-Diphenylmethane-bis-maleimide (80 Parts)

(C) 4,4'-Diaminodiphenylmethane (28 Parts)

The above-mentioned three components were dissolved in 50 parts of methyl cellosolve at 120° C. and reacted at 120° C. for 30 minutes, followed by cooling of the reaction mixture to room temperature. 78 Parts of methyl ethyl ketone were added to the reaction mixture to prepare a reddish and transparent varnish having a solid content of 50% by weight.

EXAMPLE 8

(A)

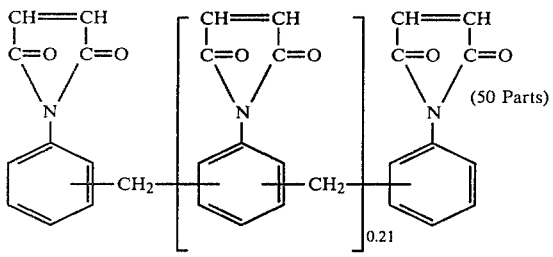
(50 Parts)

(B) N,N'-4,4'-Diphenyl-ether-bis-maleimide (50 Parts)

(C) 4,4'-Diaminodiphenylmethane (25 Parts)

The above-mentioned three components were dissolved in 50 parts of ethyl cellosolve at 120° C. and reacted at 120° C. for 30 minutes, followed by cooling of the reaction mixture to room temperature. 78 Parts of methyl ethyl ketone were added to the reaction mixture to prepare a reddish and trasparent varnish having a solid content of 50% by weight.

EXAMPLE 9

(A)

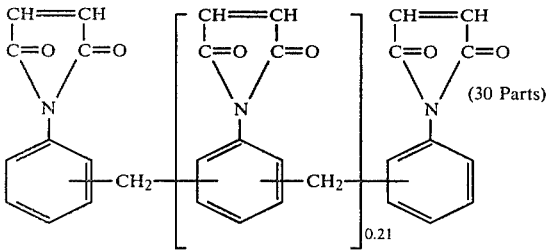
(30 Parts)

(B) N,N'-4,4'-Diphenylmethane-bis-maleimide (70 Parts)

(C) 4,4'-Diaminodiphenylmethane (40 Parts)

The above-mentioned three components were dissolved in 50 parts of methyl cellosolve at 120° C. and reacted at 120° C. for 30 minutes, followed by cooling of the reaction mixture to room temperature. 78 Parts of methyl ethyl kitone were added to the reaction mixture to prepare a reddish and transparent varnish having a solid content of 50% by weight.

The prepolymers which had been prepared in substantially the same manners as described in Examples 1 to 6, respectively, except that the use of the polyfunctional maleimide compounds as the component (A) had been omitted could be slightly dissolved in each of acetone and methyl ethyl ketone to give a solution having a solid concentration of only less than 10% by weight.

Laminated boards were prepared by using the prepolymers prepared in Examples 1 to 9, respectively, in the following manner.

A prepolymer was dissolved in a mixed solvent of methyl ethyl ketone and methyl cellosolve (mixing weight ratio=6:4) to prepare a varnish having a solid content of 50% by weight. With respect to Examples 7, 8 and 9, the varnishes prepared in the manners as described in Examples 7, 8 and 9, respectively, were used. Nine strips of a 0.18 mm-thick aminosilane-treated glass cloth WE-18G-104BX (trade name of a glass cloth manufactured by Nittobo K. K., Japan) were impregnated with the varnish, followed by drying at 130° to 150° C. for 10 minutes, to prepare nine strips of an impregnated glass cloth having a resin content of 45% by weight. The nine strips of the impregnated glass cloth were contact-bonded at 170° C. under a pressure of 30 Kg/cm$^2$ for 60 minutes, followed by post-curing at 200° C. for 120 minutes, to prepare a laminated board having a thickness of 1.6 mm.

For the purpose of comparison, a laminated board (Comparative Example No. 1) was prepared in substantially the same manner as described above except that Kerimid 601 (trade name of an amino-bis-maleimide type prepolymer manufactured by Rhone-Pouelenc S. A., France) was dissolved in N-methyl-2-pyrrolidone to prepare a varnish and the contact-bonding was carried out at 180° C. for 75 minutes, followed by post-curing at 220° C. for 180 minutes.

The properties of the laminated boards thus prepared are shown in Table 1, together with the properties of a 1.6 mm-thick glass-epoxy laminated board LE-61 (trade name of a glass-epoxy laminated board manufactured in accordance with NEMA G-10 by Hitachi Chemical Company Ltd., Japan) as another comparative laminated board (Comparative Example 2).

TABLE 1

| | | Example No. | | | | | | | | | Comparative Example No. | |
|---|---|---|---|---|---|---|---|---|---|---|---|---|
| | | 1 | 2 | 3 | 4 | 5 | 6 | 7 | 8 | 9 | 1 | 2 |
| Contact-Bonding | Tempera- | 170 | 170 | 170 | 170 | 170 | 170 | 170 | 170 | 170 | 180 | 170 |

TABLE 1-continued

| | | Example No. | | | | | | | | | Comparative Example No. | |
|---|---|---|---|---|---|---|---|---|---|---|---|---|
| | | 1 | 2 | 3 | 4 | 5 | 6 | 7 | 8 | 9 | 1 | 2 |
| Conditions | ture (°C.) | | | | | | | | | | | |
| | Time (minute) | 60 | 60 | 60 | 60 | 60 | 60 | 60 | 60 | 60 | 75 | 60 |
| Post-Curing Conditions | Temperature (°C.) | 200 | 200 | 200 | 200 | 200 | 200 | 200 | 200 | 200 | 220 | — |
| | Time (minute) | 120 | 120 | 120 | 120 | 120 | 120 | 120 | 120 | 120 | 180 | — |
| Flexural Strength (Kg/mm$^2$) | 20° C. | 55 | 55 | 58 | 60 | 58 | 54 | 58 | 58 | 58 | 60 | 55 |
| Relative Flexural Strength(%) | 100° C. | 92 | 88 | 90 | 86 | 90 | 86 | 92 | 90 | 92 | 85 | 70 |
| | 150° C. | 82 | 80 | 82 | 78 | 80 | 77 | 84 | 82 | 82 | 80 | 45 |
| | 180° C. | 75 | 72 | 74 | 70 | 73 | 70 | 75 | 72 | 75 | 75 | — |
| | 220° C. | 67 | 65 | 63 | 60 | 64 | 62 | 66 | 63 | 66 | 65 | — |
| Relative Flexural Strength after Heat Treatment (%) | 500 hours | 100 | 100 | 100 | 100 | 100 | 100 | 100 | 100 | 100 | 100 | — |
| | 1000 hours | 90 | 88 | 88 | 84 | 90 | 86 | 90 | 88 | 90 | 85 | — |
| | 1500 hours | 80 | 80 | 78 | 72 | 77 | 76 | 82 | 75 | 77 | 77 | — |
| | 2000 hours | 64 | 65 | 63 | 58 | 62 | 60 | 65 | 60 | 64 | 60 | — |
| Starting Temperature of Weight Decrease (°C.) | | 407 | 400 | 405 | 390 | 403 | 392 | 405 | 400 | 405 | 405 | 340 |
| Weight Decrease till 500° C.(%) | | 20 | 22 | 18 | 25 | 18 | 26 | 17 | 22 | 20 | 20 | 65 |
| Flammability (According to UL-94) | | V-O | V-O | V-O | V-O | V-O | V-O | V-O | V-O | V-O | V-O | flammable |
| Boiling Water Absorption (%) | | 0.41 | 0.42 | 0.41 | 0.40 | 0.41 | 0.40 | 0.41 | 0.40 | 0.40 | 0.65 | 0.23 |

Note

Testing Methods (1) Flexural Strength: According to Japanese Industrial Standard C 6481
(2) Relative Flexural Strength: Flexural strength at a given temperature relative to flexural strength at 20° C.
(3) Relative Flexural Strength after Heat Treatment: Flexural strength (at 180° C.) after heating at 220° C. for a given time relative to flexural strength (at 180° C.) before the heating
(4) Starting Temperature of Weight Decrease and Weight Decrease till 500° C.: According to heat weight-decrease analysis using a thermobalance in air at a temperature-increasing rate of 5° C./minute
(5) Flammability: According to Underwriters Laboratories-94 (vertical burning test)
(6) Boiling Water Absorption: According to Japanese Industrial Standard K 6911

As is apparent from Table 1, the laminated boards prepared by using the prepolymers obtained according to the process of the present invention are comparable in heat resistance to and better in boiling water absorption than the laminated board prepared by using Kerimid 601, and better in heat resistance than the glass-epoxy laminated board LE-61. The prepolymers obtained according to the process of the present invention are advantageous over Kerimid 601 in that they can be used in the form of a solution thereof in a cheaper and low boiling point solvent such as acetone, methyl ethyl ketone or methyl cellosolve for the production of laminated boards.

What is claimed is:

1. A process for preparing a thermosetting maleimide prepolymer, which comprises heating, at a temperature of 100° to 150° C. for 10 to 60 minutes,
(A) a polyfunctional maleimide compound obtained by the dehydration reaction of an amide acid formed from maleic anhydride and a polyamine prepared by the condensation of aniline with formaldehyde and represented by the formula (1):

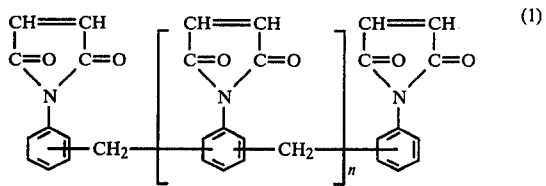

wherein n is in the range of from 0.1 to 3.0;
(B) a bis-maleimide selected from the group consisting of N,N'-4,4'-diphenylmethane-bis-maleimide, N,N'-methylenebis-(3-chloro-p-phenylene)-bis-maleimide, N,N'-4,4'-diphenyl-sulfone-bis-maleimide, N,N'-4,4'-diphenyl-ether-bis-maleimide, N,N'-ethylene-bis-maleimide, N,N'-hexamethylene-bis-maleimide and combinations thereof; and
(C) a diamine selected from the group consisting of 4,4'-diaminodicyclohexylmethane, 1,4-diaminocyclohexane, 2,6-diaminopyridine, m-phenylenediamine, p-phenylenediamine, 4,4'-diaminodiphenylmethane, 2,2'-bis(4-aminophenyl)propane, benzidine, 4,4'-diaminodiphenylsulfone, bis(4-aminophenyl) methylphosphine oxide, bis(4-aminophenyl)phenylphosphine oxide, bis(4-aminophenyl)methylamine, 1,5-diaminonaphthalene, m-xylylenediamine, p-xylylenediamine, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)-thialoro(4,5-d)thiazole, 5,5'-di(m-aminophenyl)-2,2'-bis(1,3,4-oxadiazolyl), 4,4'-diaminodiphenyl ether, 4,4'-bis(p-aminophenyl)-2,2'-dithiazole, m-bis(4-p-aminophenyl-2-thiazolyl)benzene, 4,4'- diaminobenzanilide, 4,4′-diaminophenyl benzoate, N,N′-bis(4-aminobenzyl)-p-phenylenediamine, 4,4′-methylenebis(2-chloroaniline) and combinations thereof;

the weight proportion of the polyfunctional maleimide compound (A) relative to the total of the polyfunctional maleimide compound (A) and the bis-maleimide (B) being 10 to 80% and the molar ratio of the total of the polyfunctional maleimide compound (A) and the bis-maleimide (B) to the diamine (C) being 1:1 to 1:0.3.

2. A process according to claim 1, wherein said diamine is m-phenylenediamine, p-phenylenediamine, 4,4′-diaminodiphenylmethane, 2,2′-bis(4-aminophenyl)-propane, 4,4′-diaminodiphenylsulfone, bis(4-aminophenyl)methylphosphine oxide, bis(4-aminophenyl)-phenylphosphine oxide, bis(4-aminophenyl)-methylamine, p-xylylenediamine, hexamethylenediamine, bis(4-aminophenyl)phenylmethane, 4,4′-diaminodiphenyl ether, 4,4′-methylenebis(2-chloroaniline) or a combination thereof.

3. A process according to claim 1 or 2, wherein the heating is effected in the dissolved state of the materials (A), (B) and (C) in a solvent.

4. A process according to claim 3, wherein said solvent is 2-methoxyethanol, 2-ethoxyethanol, 2-(methoxymethoxy)ethanol or 2-isopropoxyethanol.

5. A thermosetting maleimide prepolymer produced by a process according to claim 1.

6. A thermosetting maleimide prepolymer produced by a process according to claim 1, wherein the bis-maleimide (B) is N,N′-4,4′-diphenylmethane-bis-maleimide and the diamine (C) is 4,4′-diaminodiphenylmethane.

7. A thermosetting maleimide prepolymer produced by a process according to claim 1, wherein the bis-maleimide (B) is N,N′-4,4′-diphenylmethane-bis-maleimide and the diamine (C) is 4,4′-methylene-bis-(2-chloroaniline).

8. A thermosetting maleimide prepolymer produced by a process according to claim 1, wherein the bis-maleimide (B) is N,N′-methylene-bis-(3-chloro-p-phenylene)-bis-maleimide and the diamine (C) is 4,4′-diaminodiphenylmethane.

9. A thermosetting maleimide prepolymer produced by a process according to claim 1, wherein the bis-maleimide (B) is N,N-4,4′-diphenyl-ether-bis-maleimide and the diamine (C) is 4,4′-diaminodiphenylmethane.

10. A thermosetting maleimide prepolymer produced by a process according to claim 1, wherein the bis-maleimide (B) is N,N′-4,4′-diphenyl-ether-bis-maleimide and the diamine (C) is hexamethylenediamine.

* * * * *